United States Patent Office 3,359,124
Patented Dec. 19, 1967

3,359,124
ZIRCON REFRACTORY
George R. Henry, Bethel Park, Pa., assignor to Harbison-Walker Refractories Company, Pittsburgh, Pa., a corporation of Pennsylvania
No Drawing. Filed Feb. 16, 1967, Ser. No. 616,457
4 Claims. (Cl. 106—57)

ABSTRACT OF THE DISCLOSURE

Ceramically bonded pressed zircon refractory shapes which are made from a batch comprising up to 30%, by weight, fused silica, 1 to 5% clay, the remainder zircon, and from 0.5 to 5%, by weight of the batch, of alkali phosphate binder added.

Related case

This case is a continuation-in-part of my application Ser. No. 519,007, filed Jan. 7, 1966, entitled, "Zircon Refractory."

Background

Zircon refractories are generally known for their resistance at elevated temperatures to acid slags, glass melts, and molten metals. They are used, for example, in glass tanks and as nozzles for continuous metal casting. They have also been suggested for the lining of malleable iron cupolas. It is an object of this invention to provide a zircon refractory shape with improved physical properties. It is another object of this invention to provide a ceramically bonded pressed zircon shape made from a batch containing an alkali phosphate.

Brief description of the invention

Briefly, according to one aspect of this invention, zircon shapes are pressed from a batch comprising, by weight, up to 30% fused silica, 1 to 5% clay, the remainder zircon, and from 0.5 to 5%, by weight of the batch, of an alkali phosphate glass added. The batch is preferably sized and graded so that about 50 to 80%, by weight, is +200 mesh and about 15% is −400 mesh. While it is permissible that the batches be pressed into shapes on a power press, it is preferable that they be shaped on an impact press. After pressing, the shapes are dried and, thereafter, burned between about cone 16 and cone 20.

Detailed description

The objects and advantages of this invention will become more clear by a careful study of the following examples. Table I includes the batches used in the preparation of Examples A, B, C, D, and E, and a tabulation of several critical properties. Examples A and B are typical of the prior art. Example A has a temporary chemical bond which burns out on firing. Example B has a clay addition which, on firing, provides a more spall-resistant brick. Examples D and E are made according to the teachings of this invention. Example C is the subject of my application Ser. No. 519,007, filed Jan. 7, 1966. Example C contains 2% of a sodium phosphate glass which, on firing, provides a unique chemically-resistant bond. Examples D and E contain a combination of clay and sodium phosphate glass as a bond, which combination provides a brick with unusually low porosity.

TABLE I

| Example No. | A | B | C | D | E |
|---|---|---|---|---|---|
| Batch: | | | | | |
| Zircon, percent | 100 | 95 | 100 | 95 | 95 |
| Clay | | 5 | | 5 | 5 |
| Binders Added: | | | | | |
| Lignin Liquor Binder, percent | 2.5 | 1 | | | |
| Polyethylene Glycol | 0.3 | | | | |
| Sodium Phosphate Glass, percent | | | 2 | 2 | 0.5 |
| Water | | 1 | 2 | 2 | 2 |
| Bulk Density, p.c.f. (Av. 3) | 227 | 224 | 233 | 236 | 227 |
| Modulus of Rupture, p.s.i. (Av. 2) | 2,070 | 2,100 | 4,120 | 5,040 | 3,450 |
| Apparent Porosity (Av. 2), percent | 21.7 | 21.0 | 17.3 | 11.5 | 18.6 |
| Special Spalling Test, One Hour To 2,200° F., Samples 4½ x 2½ x 2″ cut from brick: | | | | | |
| Mixes A, B, C, E | No cracks. | | | | |
| Mix D | Minor crack. | | | | |
| Dynamic Slag Test at 2,800° F., Using Grains of Cupola Slag: | | | | | |
| Volume Erosion, cc | 22 | | 21 | | 22 |
| Depth of Penetration, Inches | 0.4 to 0.6 | | 0 to 0.25 | | 0 to 0.35 |

The batches in Table I were tempered with sufficient water so that on mixing they obtained a pressable character. After mixing, the brick were impact pressed. The brick were then dried at about 250° F. for about five hours, and thereafter burned at cone 18.

Table I establishes that sodium phosphate glass additions to zircon mixes increases brick density and substantially increases brick strength. The combination of clay and phosphate provides an unusual reduction in the apparent porosity of the brick. High bulk density, high strength, and low apparent porosity have traditionally been considered desirable brick properties. These are provided by brick made according to this invention. However, for particular applications, more specific considerations must be made. Nozzles to be used in the continuous casting process must have good thermal shock resistance; that is, tendency not to crack or spall on rapid heating. A test was devised to measure the resistance of zircon brick to thermal shock. In this test, samples are heated to 2200° F. in one hour, and thereafter observed for cracking. All of the brick in Table I survive this test, with the exception of Example D. Results of this test indicate that Examples C and E would be especially useful as nozzles for continuous casting. Example D, because of its low apparent porosity, would have outstanding slag resistance, but should be considered for applications where thermal shock is minimized.

Three of the examples in Table I were subjected to a dynamic slag test, wherein iron cupola slag was dripped over samples inclined 30° to the horizontal at 2800° F. The samples were then observed for erosion and penetration. The results of this test indicate that brick made according to this invention have an increased resistance to penetration of slags.

In an attempt to improve on the thermal shock properties of mixes containing both clay and phosphate glass similar to Example D, mixes were made containing coarse additions of fused silica. The batches of these examples are given in Table II along with their physical properties and special spalling test results. Example F is made containing the temporary chemical bonds used by the prior art for comparison. Examples G through J are made according to the teachings of this invention. (All brick, F-J, were burned.)

chain lengths have been found most suitable. Alkaline earth phosphates do not work.

Exemplary clays suitable for use herein are plastic clays, either crude or air-floated. Such clays are well known in the refractories art. The chemical analysis of the clay used in the examples is given in Table IV.

TABLE II

| Example No. | F | G | H | I | J |
|---|---|---|---|---|---|
| Batch: | | | | | |
| Fused Silica, percent | 15 | 15 | 15 | 30 | 5 |
| Zircon | 80 | 80 | 80 | 65 | 90 |
| Clay | 5 | 5 | 5 | 5 | 5 |
| Binders Added: | | | | | |
| Lignin Liquor Binder, percent | 1 | | | | |
| Sodium Phosphate Glass, percent | | 2 | 2 | 2 | 0.5 |
| Water | 1 | 2 | 2 | 4 | 2 |
| Method of Manufacture: | | | | | |
| Mixes F, G, I, J | | Power Pressed at 8,000 p.s.i. | | | |
| Mix H | | | Impact Pressed. | | |
| Bulk Density, p.c.f. (Av. 5) | 197 | 208 | 197 | 174 | 216 |
| Modulus of Rupture, p.s.i. (Av. 2) | 900 | 2,800 | 2,810 | 1,870 | 3,190 |
| Apparent Porosity (Av. 2), percent | 20.5 | 8.7 | 17.4 | 14.7 | 19.4 |
| Special Spalling Test, One Hour To 2,200° F., Samples 4½ x 2½ x 2″ cut from brick | | | No cracks. | | |

Table II establishes that zircon mixes containing the clay-phosphate bond can be made thermal shock resistant by a coarse fused silica addition. (Compare Examples G, H, I, and J with Example D in Table I.) Table II also establishes the superiority of the phosphate bond. Comparing Examples F and G, the strength has more than doubled and the apparent porosity decreased more than one-half by following the teachings of this invention. Comparing Examples G and H, both made according to this invention, there appears a decided advantage in impact pressing. However, brick made by power pressing have desirable properties.

Commercially available zircon is manufactured by a process which beneficiates certain beach sands. The product of this process is known as "granular," because it is usually finer than 65 mesh. It is possible to manufacture coarser zircon grogs (for example, −10+65 mesh) at an added expense. Examples K, L, and M, given in Table III, contain grog additions.

TABLE III

| Example No. | K | L | M |
|---|---|---|---|
| Batch: | | | |
| Zircon: | | | |
| (−10+65 mesh grog), percent | 15 | 30 | 30 |
| (Granular and Fines) | 80 | 65 | 65 |
| Clay | 5 | 5 | 5 |
| Binders Added: | | | |
| Sodium Phosphate Glass, percent | 2 | 2 | 2 |
| Water | 2 | 2 | 2 |
| Method of Manufacture: | | | |
| Mixes K, L | Impact pressed 8 seconds. | | |
| Mix M | | | Power pressed at 8,000 p.s.i. |
| Bulk Density, p.c.f. (Av. 3) | 236 | 235 | 226 |
| Modulus of Rupture, p.s.i. (Av. 2) | 5,620 | 5,220 | 5,060 |
| Apparent Porosity (Av. 2), percent | 10.1 | 11.0 | 16.0 |

Table III establishes that grog additions can be used with slight improvements in physical properties. Table III also establishes the desirability of impact pressing (compare Examples L and M).

Suitable alkali phosphates for use in the practice of this invention are sodium and potassium ortho and pyrophosphates. The alkali phosphate glasses are preferred. They generally have an alkali oxide-phosphate ratio from about 1:1 to 2:1. The sodium hexametaphosphates of various

TABLE IV

| | Clay, percent | Zircon, percent |
|---|---|---|
| Silica (SiO$_2$) | 54.0 | 32.3 |
| Alumina (Al$_2$O$_3$) | 30.1 | 1.0 |
| Titania (TiO$_2$) | 1.7 | 0.2 |
| Iron Oxide (Fe$_2$O$_3$) | 1.0 | 0.2 |
| Lime (CaO) | 0.2 | 0.16 |
| Zirconia (ZrO$_2$) | 0.0 | 66.1 |
| Magnesia (MgO) | 0.3 | 0.04 |
| Alkalies | 0.9 | |
| Loss on ignition | 12.3 | |

Having thus described the invention in detail and with sufficient particularity as to enable those skilled in the art to practice it, what is desired to have protected by Letters Patent is set forth in the following claims.

I claim:
1. A method of making ceramically bonded, pressed zircon shapes comprising the steps of:
   (1) preparing a size-graded batch of up to 30%, by weight, fused silica, 1 to 5% clay, the remainder zircon, and 0.5 to 5%, by weight of the batch, of an alkali phosphate binder added,
   (2) tempering with sufficient water so that the batches obtain pressable character,
   (3) forming the batches into shapes by pressing,
   (4) drying the shapes, and
   (5) burning the dried shapes.
2. The method of claim 1 in which the batch contains at least 5% fused silica.
3. The method of claim 1 in which the fused silica is all −10+65 mesh.
4. The method of claim 1 in which the alkali phosphate is an alkali phosphate glass.

References Cited

UNITED STATES PATENTS 2,681,860   6/1954   Rhodes et al. _____ 106—57
2,880,097   3/1959   Emhiser _____ 106—57

FOREIGN PATENTS 1,028,944   5/1966   Great Britain.

TOBIAS E. LEVOW, *Primary Examiner.*

JAMES E. POER, *Examiner.*